(12) United States Patent
Takeuchi et al.

(10) Patent No.: US 6,797,019 B2
(45) Date of Patent: *Sep. 28, 2004

(54) ELECTROCHEMICAL CELL HAVING AN ELECTRODE OF SILVER VANADIUM OXIDE COATED TO A CURRENT COLLECTOR

(75) Inventors: Esther S. Takeuchi, East Amherst, NY (US); Randolph A. Leising, Williamsville, NY (US); Marcus Palazzo, North Tonawanda, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 264 days.

This patent is subject to a terminal disclaimer.

(21) Appl. No.: 10/013,287

(22) Filed: Dec. 10, 2001

(65) Prior Publication Data

US 2003/0198868 A1 Oct. 23, 2003

(51) Int. Cl.[7] .............................................. H01M 6/00
(52) U.S. Cl. ...................... 29/623.5; 429/217; 429/219; 429/220; 429/231.2
(58) Field of Search ........................ 29/623.5; 429/217, 429/219, 220, 245, 231.2, 231.5

(56) References Cited

U.S. PATENT DOCUMENTS

| | | | |
|---|---|---|---|
| 4,310,609 A | * | 1/1982 | Liang et al. ................ 429/330 |
| 4,830,940 A | | 5/1989 | Keister et al. |
| 5,340,368 A | * | 8/1994 | Koksbang et al. ......... 29/623.5 |
| 5,571,640 A | | 11/1996 | Takeuchi et al. |
| 6,001,507 A | * | 12/1999 | Ono et al. ................... 429/217 |
| 6,027,827 A | | 2/2000 | Gan et al. |
| 6,060,184 A | | 5/2000 | Gan et al. |
| 6,087,809 A | | 7/2000 | Gan et al. |
| 6,093,506 A | * | 7/2000 | Crespi et al. ............... 429/219 |
| 6,136,477 A | | 10/2000 | Gan et al. |
| 6,165,638 A | | 12/2000 | Spillman et al. |
| 6,180,282 B1 | * | 1/2001 | Nishida et al. ............. 429/137 |
| 6,566,007 B1 | | 5/2003 | Takeuchi et al. |
| 2002/0076611 A1 | | 6/2002 | Palazzo et al. |
| 2002/0098411 A1 | | 7/2002 | Gan et al. |

* cited by examiner

*Primary Examiner*—Gregg Cantelmo
(74) *Attorney, Agent, or Firm*—Michael F. Scalise

(57) ABSTRACT

The invention is directed to an SVO electrochemical cell having high rate capability. The cathode is produced by coating a mixture of an active material, conductive additives, a mixed binder, and an aluminum foil current collector. The mixed binder consists of a mixture of heat treated polyamic acid with PVDF. The use of heat treated polyamic acid maintains adhesion to the conductive current collector while the PVDF portion of the binder gives flexibility. A particularly preferred couple is of a lithium/silver vanadium oxide (Li/SVO) chemistry and the binder mixture enables an active slurry of SVO to be coated onto a current collector without delamination.

21 Claims, 3 Drawing Sheets

ELECTROCHEMICAL CELL HAVING AN ELECTRODE OF SILVER VANADIUM OXIDE COATED TO A CURRENT COLLECTOR

BACKGROUND OF THE INVENTION

1. Field of the Invention

The present invention relates to the conversion of chemical energy to electrical energy and, more particularly, to a cathode of silver vanadium oxide (SVO) admixed with a combination of polymeric binders. Importantly, the silver vanadium oxide admixture is coated to a current collector for incorporation into an electrochemical cell. Prior to the present invention, SVO could only be contacted to a current collector as a pressed powder or as a free-standing sheet. The preferred binder formulation is a mixture of a halogenated polymeric binder and a polymide binder, most preferably polyvinylidene fluoride (PVDF) and a polyimide. The present electrodes built from SVO containing the mixed polymeric binders are useful in both primary and secondary cells discharged at elevated and low temperatures.

2. Prior Art

Halogenated polymeric materials have been used extensively as binders for electrodes in all types of nonaqueous electrochemical cells, and particularly lithium cells. For example, polyvinylidene fluoride is a material that functions well as an electrode active binder at or near ambient temperature. However, PVDF is soluble in organic electrolytes at elevated temperatures. Thus, cells manufactured with PVDF as the sole binder material cannot be used in high temperature applications or survive high temperature exposure, such as occurs in an autoclave, without severe degradation.

It is also known in the prior art to employ non-halogenated polymeric materials as binders in nonaqueous, alkali metal electrochemical cells. Exemplary is U.S. Pat. No. 5,468,571 to Asami et al. which discloses that polyimide (PI) is useful as an anode binder in lithium secondary cells. Electrodes containing such non-halogenated polymers as the sole binder material are somewhat brittle and have a tendency to crack.

U.S. Pat. No. 6,001,507 to Ono et al. describes electrodes for secondary cells prepared from a mixture of a soluble polyimide and PVDF combined with an active material such as $LiCoO_2$. The soluble polyimide is a material which is converted to the imide before it is mixed with the depolarizing active mixture. This is done to prevent water from entering the electrochemical system. However, fabricating an electrode with binders which are soluble in nonaqueous solvents hinders the active mixture/current collector contact interface, especially after repeated cycling.

Thus, there is a need for a binder formulation that is insoluble in both primary and secondary organic solvent electrolyte systems, particularly those used to activate alkali metal primary cells or alkali metal ion secondary cells, and is able to withstand high temperature exposure without compromising discharge efficiency.

U.S. Pat. No. 5,571,640 to Takeuchi et al. describes a process for manufacturing a cathode component from a free-standing sheet of active material, such as of SVO. The comminuted SVO is combined with a binder and conductive additives suspended in a solvent to form a paste. The paste is then fed into a series of roll mills to form a silver vanadium oxide sheet, which is then pressed to a current collector. This patent is described as being an improvement over building cathodes from a powdered silver vanadium oxide pressed to a current collector.

Prior to the present invention, it was not possible to build a silver vanadium oxide cathode by other than pressing a powder or a free-standing sheet of the active material to a current collector. As will be described in detail hereinafter, coating a slurry of electrode active material, particularly of silver vanadium oxide, to a current collector results in improved discharge efficiency, especially during pulsing, in comparison to the prior art techniques. This improvement is believed to be directly attributable to the novel binder mixture.

SUMMARY OF THE INVENTION

The present invention is, therefore, directed to an electrode built of an active material including a mixture of two polymeric binders useful in nonaqueous organic electrolytes activating alkali metal or alkali metal ion electrochemical cells, and a method that provides flexible, no-brittle electrodes, particulary of silver vanadium oxide, dischargeable at elevated tempratures. The first binder is preferably a halongenated polymeric binder and, more preferably, a fluorinated polymeric material, such as PVDF. The second binder is polyimide, and preferably one derived from heating a polyamic acid prior to activating the electrochemical couple. A pereferred binder mixture is PVDF and PI.

To construct an electrode, for example of a mixture of silver vanadium oxide, polyamic acid and PVDF, and possibly a conductive diluent, the active admixture is first formed into a slurry having the consistency of a milk shake and coated to a current collector. This electrode assembly is then heated to convert the polyamic acid to an insoluble polyimide prior to being incorporated into an electrochemical cell.

These and other aspects of the present invention will become increasingly more apparent to those of ordinary skill in the art by reference to the following description taken in conjunction with the accompanying drawings.

DETAILED DESCRIPTION OF THE PREFERRED EMBODIMENTS

Figure 1:
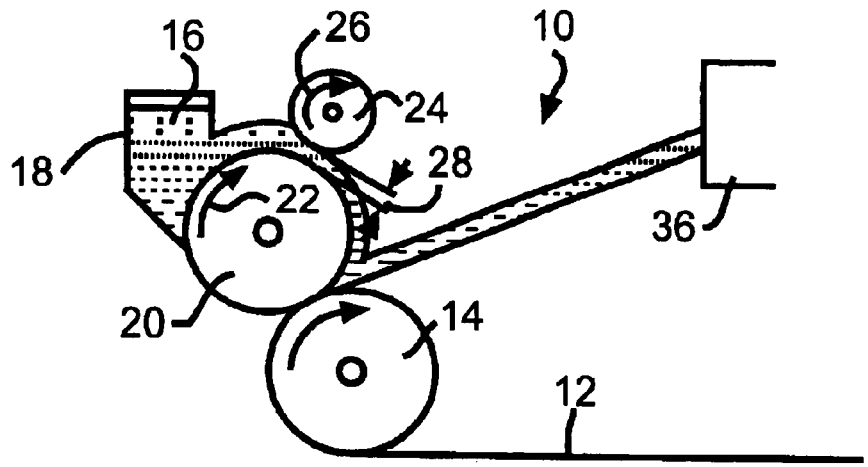
FIG. 1 is a schematic of an electrode active slurry being roll coated onto a current collector according to the present invention.

As used herein, the term "pulse" means a short burst of electrical current of a significantly greater amplitude than that of a pre-pulse current immediately prior to the pulse. A pulse train consists of at least two pulses of electrical current delivered in relatively short succession with or without open circuit rest between the pulses. An exemplary pulse train may consist of four 10 second pulses with a 15 second rest between each pulse.

The present invention is directed to the fabrication of electrodes for use in primary and secondary electrochemical cells dischargeable at elevated temperatures, such as occur in down hole well drilling operations and in an autoclave, without diminished discharge performance in comparison to cells of a similar active chemistry discharged at or near ambient temperatures. Additionally, the present cells are dischargeable at ambient temperatures with increased discharge capability in comparison to similar conventional cells. For that purpose, the electrode active material is intimately combined with a binder mixture consisting of a first, halogenated polymeric constituent and a second, polyamic acid to form an electrode active admixture. If desired, a conductive diluent can also be added to the admixture to promote conductivity. Upon heating, the polyamic acid is converted to a polyimide. Preferably, the active mixture is coated to a conductive current collector prior to the conversion heating step.

Halogenated polymeric materials suitable as the first binder constituent are preferably fluorinated resins, for example, polytetrafluoroethylene, modified polytetrafluoroethylene, polyhexafluoropropylene, tetrafluoroethylene-hexafluoropropylene copolymers, tetrafluoroethylene-perfluoroalkyl vinyl ether copolymers, polytrifluoroethylene, ethylene-tetrafluoroethylene copolymers, fluoroethylene-hydrocarbon vinyl ether copolymers, polychlorotrifluoroethylene, ethylene-chlorotrifluoroethylene copolymers, polyvinyl fluoride, polyvinylidene fluoride (PVDF), vinylidene fluoride-hexafluoropropylene copolymers, fluorinated (meth)acrylate resins, 2-fluoroacrylate resins, fluorinated epoxy resins, fluorinated epoxy (meth)acrylate resins, fluorinated polyether resins, fluorinated polyimide resins, fluorinated polyester resins, fluorinated polyamide resins, fluorinated polycarbonate resins, fluorinated polyformal resins, fluorinated polyketone resins, fluorinated polyazomethine resins, fluorinated polyazole resins, and fluorinated polyallyloxysilane resins. The first binder constituent can also be a fluorinated elastomer such as vinylidene fluoride-hexafluoropropylene fluoroelastomer, vinylidene fluoride-tetrafluoroethylene fluoroelastomer, tetrafluoroethylene-perfluoroalkyl vinyl ether fluoroelastomer, vinylidene fluoride-tetrafluoroethylenehexafluoropropylene fluoroelastomer, vinylidene fluoride-tetrafluoroethylene-perfluoroalkyl vinyl ether fluoroelastomer, tetrafluoroethylene-perfluoroalkyl vinyl ether fluoroelastomer, propylene-tetrafluoroethylene fluoroelastomer, fluorosilicone rubber, fluorinated phosphazene rubber, fluorinated thermoplastic rubbers, and flexible fluorocarbon resins. Any one of the fluorinated resins and fluorinated elastomers are suitable as the first, halogenated polymeric constituent when used alone or in mixtures thereof.

The second binder constituent is a polyimide derived from a polyamic acid precursor. In particular, the product polyimide is insoluble in nonaqueous solvents typically used as activating electrolytes for alkali metal and alkali metal ion-containing cells.

The content of the fluorinated polymer is not particularly limited, but is preferably at least 20%, by weight, of the mixture of the first and second binders. Less than 20% by weight of the fluorinated polymer constituent results in insufficient cohesion of the electrode active material during electrode fabrication and assembly of the cell, and during charge/discharge cycling.

A typical electrode for a nonaqueous, alkali metal electrochemical cell is made from a mixture of 80 to 95 weight percent of an electrode active material, 1 to 10 weight percent of a conductive diluent and 3 to 25 weight percent of a mixture of the polymeric binders according to the present invention comprising the first, halogenated polymeric constituent and the second, polyamic acid conversion polyimide constituent. The first binder is preferably used in a powdered form while the second binder is typically provided in a solvent slurry. Less than 3 weight percent of the binder mixture provides insufficient cohesiveness to the loosely agglomerated electrode active materials to prevent delamination, sloughing and cracking during electrode preparation and cell fabrication and during cell discharge. More than 25 weight percent of the binder mixture provides a cell with diminished capacity and reduced current density due to lowered electrode active density.

The above-described binder mixture is generally used by dissolving or dispersing the materials in respective powder and liquid acidic forms in a solvent, although the binder materials may sometimes be used without a solvent. Suitable solvents include water, methyl ethyl ketone, cyclohexanone, isophoron, N-methyl-2-pyrrolidone (NMP), N,N-dimethylformamide, N,N-dimethylacetamide, toluene, and mixtures thereof.

The most preferred binder formulation according to the present invention comprises a mixture of polyvinylidene fluoride (PVDF) as the first binder constituent and polyamic acid conversion polyimide (PI) as the second binder constituent. The preferred binder composition ranges from, by weight, about 1% PVDF:99% PI to about 99% PVDF:1% PI with a more preferred composition ranging from about 40% PVDF:60% PI to about 60% PVDF:40% PI, and most preferably about 50% PVDF to 50% PI. Suitable conductive diluents include acetylene black, carbon black and/or graphite. Metals such as nickel, aluminum, titanium and stainless steel in powder form are also useful as conductive diluents when mixed with the above listed active materials.

FIG. 1 is a schematic of a roll coating assembly 10 according to one preferred method of coating an electrode active mixture onto a current collector 12. The current collector is of a conductive material such as of a titanium, aluminum, nickel, stainless steel, or copper foil or expanded screen or grid provided in bulk rolled up on an unwind roller 14. The active slurry 16 including the present binder mixture is contained in a weep tray 18 provided in a fluid flow communication with an application roller 20 rotating in a clockwise direction, as indicated by arrow 22. The application roller rotates in conjunction with a metering roller 24, also rotating in a clockwise direction as indicated by arrow 26, to regulate the thickness of the slurry laid down onto the unwinding current collector 12. The metering roller 24 is spaced from the application roller 20 by a gap, indicated by arrows 28, set at the desired thickness of the active coating on the current collector 12. This gap is adjustable. The electrode active coating preferably has a thickness in the range of from about 0.001 inches to about 0.05 inches.

Figure 2:
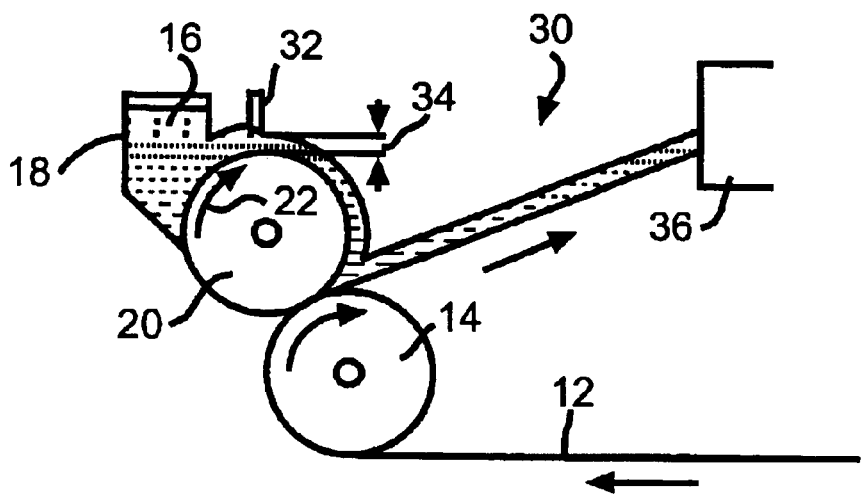
FIG. 2 is a schematic of an electrode active slurry being coated onto a current collector using a doctor blade according to the present invention.

FIG. 2 shows another preferred assembly 30 for coating an active slurry onto the current collector 12 playing out from the unwind roller 14. This method is similar to that shown in FIG. 1 except that the thickness of the active slurry 16 laid down on the unwinding current collector is accomplished in a different manner. Instead of a metering roller, a doctor blade 32 is use. The doctor blade 32 is spaced from the application roller 20 by a gap, indicated by arrows 34, set at the desired thickness of the active slurry coating on the current collector 12. This gap between the doctor blade 32 and the application roller 12 is adjustable to provide the electrode active coating preferably having a thickness in the range of from about 0.001 inches to about 0.05 inches.

Another embodiment of the present invention for coating the active slurry 16 on the current collector 12 is termed a "knife over roll" technique. This technique is similar to that shown in FIG. 2, but does not include the current collector 12 rounding an unwind roller separate from the application roller. Instead, the current collector unfurls from an unwind roller spaced from the doctor blade by a gap directly related to the intended thickness of the slurry coating on the current collector. The coated current collector then moves to an oven 36 for curing. The knife over roll technique eliminates the unwind roller 14 from the assembly of FIG. 2.

If desired, the active coating is layered on both sides of a perforated current collector with an intermediate curing step. This serves to lock the active material together through openings provided in the intermediate grid. The final thickness of the electrode laminate is in the range of about 0.003 to about 0.1 inches.

Whether the electrode is for use in a primary or a secondary chemistry, before incorporation into an electrochemical cell, the active slurry coated current collector ispreferably first cured in the oven 36 (FIGS. 1 and 2). This occurs at a temperature of about 130° C. to about 360° C. for a period of about 30 minutes to about 5 hours. A more preferred curing protocol is to heat the electrode at about 260° C. for about; 1 hour. Secondary cell negative electrodes must be cured under an argon atmosphere to prevent oxidation of the copper current collector.

An electrochemical cell constructed according to the present invention, whether of a primary or a secondary chemistry, includes an anode active material selected from Groups IA, IIA, or IIIB of the Periodic Table of Elements, including lithium, sodium, potassium, etc., and their alloys and intermetallic compounds including, for example Li—Si, Li—B, Li—Si—B alloys and intermetallic compounds. The preferred anode active material comprises lithium. For a primary cell, the preferred anode comprises a lithium alloy, the preferred lithium alloy being a lithium-aluminum alloy. The greater the amount of aluminum present by weight in the alloy, however, the lower the energy density of the cell.

In secondary electrochemical systems, a carbonaceous negative electrode is preferred. The carbon comprises any of the various forms of carbon (e.g., coke, graphite, acetylene black, carbon black, etc.) which are capable of reversibly retaining the lithium species. Graphite is preferred due to its relatively high lithium-retention capacity. Carbon fibers are particularly advantageous because they have excellent mechanical properties which permit them to be fabricated into rigid electrodes that are capable of withstanding degradation during repeated charge-discharge cycling. Moreover, their high surface area allows rapid charge/discharge rates. The carbon may be contacted to a conductive substrate such as by pressing, bonding, and the like. A preferred carbonaceous material for the negative electrode of a secondary electrochemical cell is described in U.S. Pat. No. 5,443,928 to Takeuchi et al., which is assigned to the assignee of the present invention and incorporated herein by reference.

A typical secondary cell negative electrode is fabricated by mixing about 90 to 97 weight percent graphite with 3 to 10 weight percent of the present invention mixture of a first, halogenated polymeric binder and a second, polyamic acid. This electrode active admixture is a viscous slurry which is coated onto a current collector such as a titanium, aluminum, nickel, stainless steel, or copper foil or screen according to the prior described FIGS. 1 and 2.

The form of the anode or negative electrode may vary. For example, in a primary cell the anode is preferably a thin metal sheet or foil of the anode metal, pressed or rolled on a metallic anode current collector, i.e., preferably comprising nickel. The anode component further has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The cathode or positive electrode of both a primary and a secondary cell is preferably of a solid, lithium retention material and the electrochemical reaction at the cathode involves conversion of ions which migrate from the anode to the cathode in atomic or molecular forms. The solid cathode material may comprise a metal, a metal oxide, a mixed metal oxide, a metal sulfide or a carbonaceous compound, and combinations thereof.

One preferred mixed metal oxide useful as the cathode of a primary cell has the general formula $SM_xV_2O_y$ wherein SM is a metal selected from Groups IB to VIIB and VIII of the Periodic Table of Elements, and wherein x is about 0.30 to 2.0 and y is about 4.5 to 6.0 in the general formula. For a more detailed description of such a cathode active material, reference is made to U.S. Pat. No. 4,310,609 to Liang et al., which is assigned to the assignee of the present invention and incorporated herein by reference. Another preferred composite cathode active material for primary cells has the general formula $Cu_xAg_yV_2O_z$, (CSVO) and the range of material compositions is preferably about $0.01 \leq x \leq 1.0$, about $0.01 \leq y \leq 1.0$ and about $5.01 \leq z \leq 6.5$. For a more detailed description of this cathode active material, reference is made to U.S. Pat. Nos. 5,472,810 to Takeuchi et al. and 5,516,340 to Takeuchi et al., both of which are assigned to the assignee of the present invention and incorporated herein by reference. For a silver vanadium oxide or copper silver vanadium oxide cathode, the current collector is preferably of aluminum or titanium, the latter being preferred.

One preferred electrochemical couple is of a lithium/silver vanadium oxide chemistry. In that case, the cathode is formed by adding PVDF to a polyamic acid/solvent slurry. This slurry is stirred to create a low viscosity mixture. Separately, dry SVO is milled with conductive additives to create a homogeneous mixture that is then mixed with the diluted binder slurry causing uniform coating of the SVO with the binder materials. As previously described, the slurry is then coated onto a current collector as shown in FIGS. 1 and 2. The polyamic acid containing cathode structure is then heat cured to cross link the packed SVO together and in close contact with the substrate. Using a higher curing temperature increases the amount of polyimide cross linking which in turn allows less expansion of the SVO and, consequently, less delamination from the current collector substrate.

Other cathode active materials useful for fabrication of primary cells include manganese dioxide, copper vanadium oxide, titanium disulfide, copper oxide, copper sulfide, iron sulfide, iron disulfide, fluorinated carbon, and mixtures thereof. Preferably, the cathode comprises from about 80 to about 99 weight percent of the cathode active material.

Additionally, a primary electrochemical cell can comprise a liquid depolarizer/catholyte, such as sulfur dioxide or oxyhalides including phosphoryl chloride, thionyl chloride and sulfuryl chloride used individually or in combination with each other or in combination with halogens and interhalogens, such as bromine trifluoride, or other electrochemical promoters or stabilizers. This type of cell requires a carbonaceous cathode current collector containing a binder mixture according to the present invention.

In secondary cells, the cathode preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$. Because conversion of polyamic acid to a polyimide results in hydrous by-products, these materials are not useful with the binder mixture of the present invention.

To discharge such secondary cells, the lithium metal comprising the positive electrode is intercalated into the carbonaceous negative electrode by applying an externally generated electrical potential to recharge the cell. The applied recharging electrical potential serves to draw the alkali metal ions from the cathode active material, through the electrolyte and into the carbonaceous anode material comprising the negative electrode. The cell is then provided with an electrical potential and discharged in a normal manner.

An alternate secondary cell construction comprises intercalating the carbonaceous material with the active alkali material before the anode is incorporated into the cell. In this case, the cathode body can be solid and comprise, but not be limited to, such materials as manganese dioxide, silver vanadium oxide, titanium disulfide, copper oxide, copper sulfide, iron sulfide, iron disulfide and fluorinated carbon. This approach is compromised by the problems associated with handling lithiated carbon outside of the cell. Lithiated carbon tends to react with explosive results when contacted by air. However, since these materials do not contain lithium ions, they are useful active materials with the present binder mixture. Upon subsequent heat curing, the polyamic acid is converted to the polyimide and the reaction water is evaporated.

Whether the cell is constructed as a primary or secondary electrochemical system, a separator is provided to physically segregate the anode and cathode active electrodes. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. The form of the separator typically is a sheet which is placed between the anode and cathode electrodes. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

Suitable nonaqueous electrolytes comprise an inorganic salt dissolved in a nonaqueous solvent, and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Suitable nonaqueous solvents are substantially inert to the anode and cathode electrode materials and preferred low viscosity solvents include tetrahydrofuran (THF), methyl acetate (MA), diglyme, triglyme, tetraglyme, dimethyl carbonate (DMC), diethyl carbonate (DEC), dipropyl carbonate (DPC), methyl ethyl carbonate (MEC), methyl propyl carbonate (MPC), ethyl propyl carbonate (EPC), 1,2-dimethoxyethane (DME), and mixtures thereof. Preferred high permittivity solvents include propylene carbonate (PC), ethylene carbonate (EC), butylene carbonate (BC), acetonitrile, dimethyl sulfoxide, dimethyl formamide, dimethyl acetamide, γ-butyrolactone (GBL), γ-valerolactone, N-methyl-pyrrolidinone (NMP), and mixtures thereof.

Known lithium salts that are useful as a vehicle for transport of alkali metal ions from the anode to the cathode, and back again include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiNO_3$, $LiO_2CCF_3$, $LiN(SO_2CF_3)_2$, $LiSCN$, $LiO_3SCF_2CF_3$, $LiC_6F_5SO_3$, $LiO_2CF_3$, $LiSO_3F$, $LiB(C_6H_5)_4$, $LiCF_3SO_3$, and mixtures thereof. Suitable salt concentrations typically range between about 0.8 to 1.5 molar.

The assembly of the cells described herein is preferably in the form of a wound element configuration. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with the other cell components.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The following examples describe the manner and process of an electrochemical cell according to the present invention, and they set forth the best mode contemplated by the inventors of carrying out the invention, but they are not to be construed as limiting.

Test Cell Preparation

A first set of fifteen test cells (Group 1) were built, each having a cathode prepared according to the prior art process described in U.S. Pat. No. 5,571,640 to Takeuchi et al. The cathode current collectors were of a titanium current collector screen. The cathodes were coupled with a lithium anode and activated by an electrolyte comprising $LiAsF_6$ dissolved in a solvent system of, by volume, 50:50 PC:DME.

A second and third sets of fifteen test cells (Groups 2 and 3) were built, each having a cathode comprising a binder slurry of, by weight, 4% polyamic acid/1% PVDF in NMP having a concentration of 8% solids. The slurry was mixed at low shear for 15 minutes. A powder mixture consisting essentially of, by weight, 91% SVO and 5% carbonaceous diluent was dry milled until a homogenous mixture was obtained. The milled solids were then added to the previously prepared binder slurry with a second low shear mixing step for ten minutes. The resulting active slurry was coated onto an aluminum foil using either a roll coating method or a doctor blade. Upon drying, the resulting cathodes were cured according to the following protocol: about 140° C. for about 30 minutes, then about 200° C. for about 30 minutes, and finally about 350° C. for about one hour. These cathodes were then coupled with a lithium anode and activated by an electrolyte comprising $LiAsF_6$ dissolved in a solvent system of, by volume, 50:50 PC:DME.

The difference between the Group 2 test cells and those of Group 3 is that the former included aluminum terminal leads welded to the aluminum foil cathode current collector by resistance welding. The Group 3 cells included aluminum terminal leads welded to the aluminum foil current collector by ultrasonic welding in lieu of resistance welding. Ultrasonic welding involves butting the terminal lead to the current collector and then directing a high frequency ultrasonic wave at the contact area. The ultrasonic wave causes the two metals to fuse together. A suitable ultrasonic welder for this purpose is commercially available from Amtech as model Ultra Weld 40. The terminal lead can be either a terminal pin or the cell casing, as is well known to those skilled in the art.

Electrochemical Testing of Cells

The Groups 1 and 2 cells were pulse discharged using a 3.0 amp current for a duration of 10 seconds. The cells were rested at open circuit voltage for 30 minutes after each pulse train of four pulses, the pulses being separated from each other by 15 seconds.

The average current density for each cell group expressed as milliamp per gram active SVO weight in the cathode is set forth in Table 1. In the Groups 1 to 3 test cells, SVO had a density of about 0.75 g/cc.

TABLE 1

| Test Cell | SVO Wt (g) | pulse current (mA) | (mA/g of SVO) |
|---|---|---|---|
| Group 1 | 7.332 | 3000 | 409.2 |
| Group 2 (FIG. 2) | 2.816 | 3000 | 1065.5 |

TABLE 1-continued

| Test Cell | SVO Wt (g) | pulse current (mA) | (mA/g of SVO) |
|---|---|---|---|
| Group 2 (FIG. 3) | 3.099 | 3000 | 968.1 |

Figure 3:
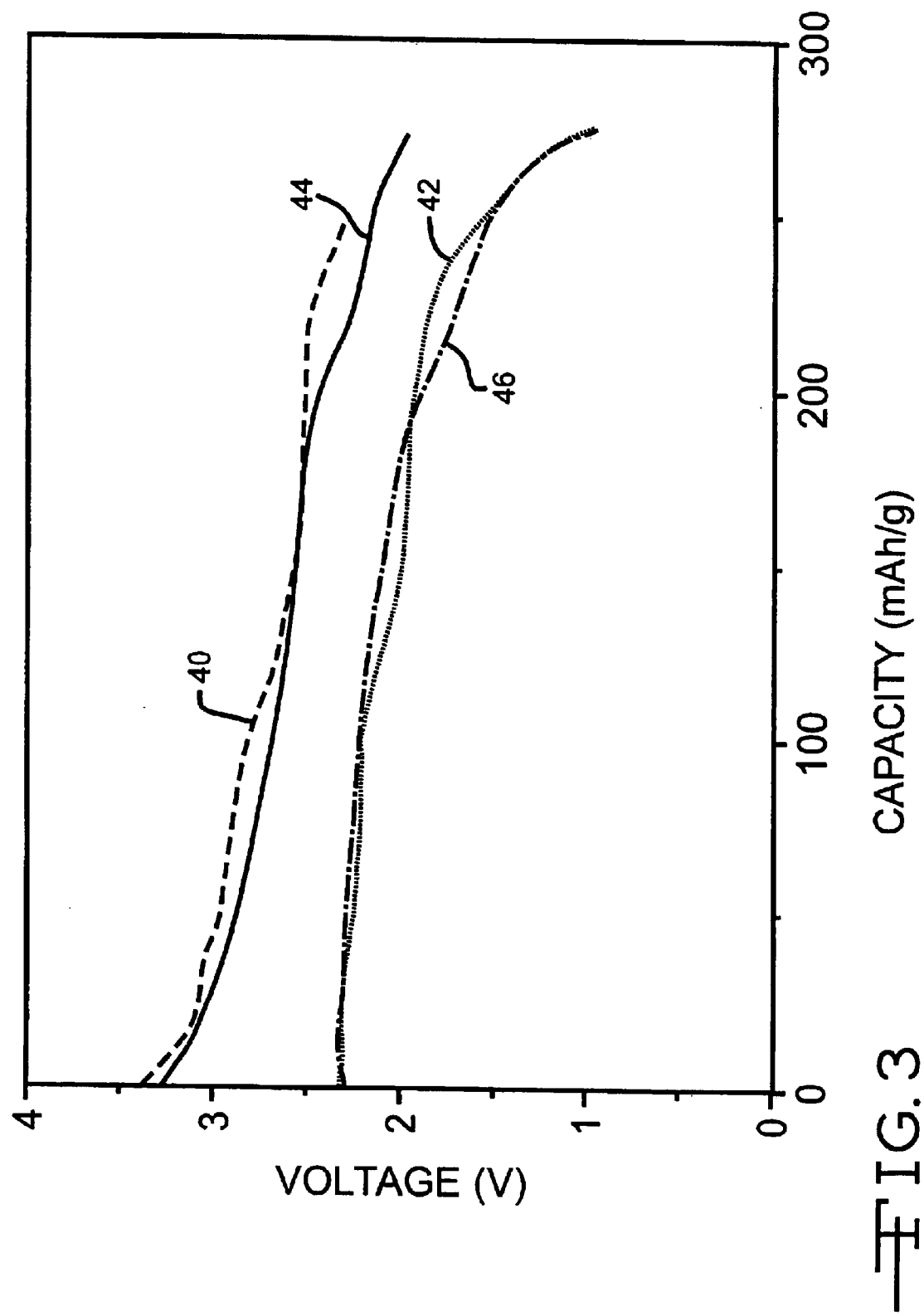
FIG. 3 is a graph illustrating the pulse discharge characteristics of a representative Li/SVO cell according to the prior art in comparison to one according to the present invention.
Figure 4:
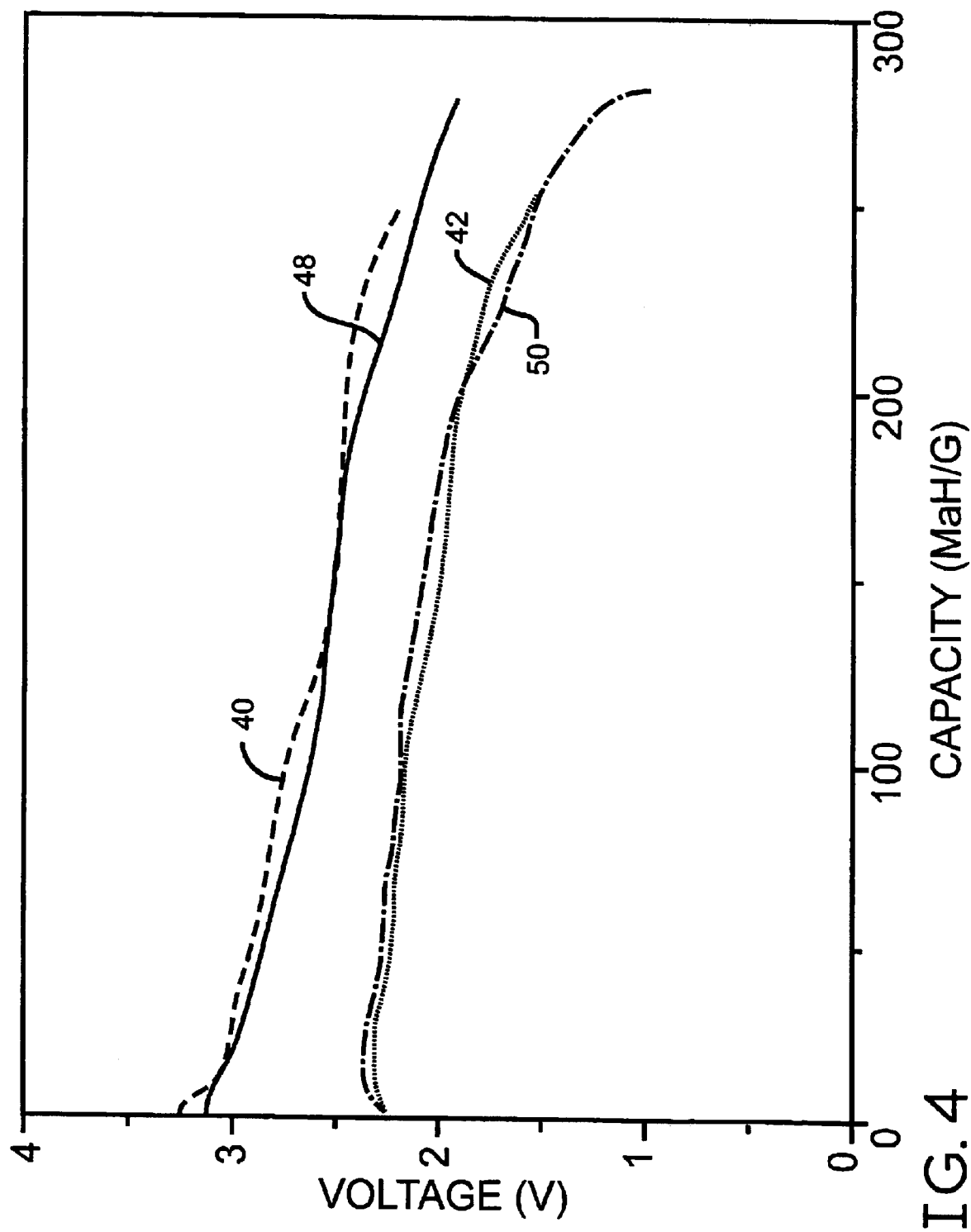
FIG. 4 is another graph comparing the pulse discharge characteristics of a representative Li/SVO cell according to the prior art in comparison to one according to the present invention.

The results (average) in Table 1 show that the cells in Group 2 had approximately twice the current load per gram active SVO as compared to the Group 1 cells. FIGS. 3 and 4 illustrate the pulse discharge curves of representative one of the Group 2 cells. In particular, FIG. 3 shows curves 40 and 42 which are the respective prepulse and pulse 1 minima of a representative Group 1 cell and curves 44 and 46 which are similar curves of a representative Group 2 cell. In FIG. 4, curves 40 and 42 are of the same cell illustrated in FIG. 3 and curves 48 and 50 are similar curves of another representative Group 2 cell. The results demonstrate that although the current loading was about 250% greater for the Group 2 cells, the voltage drop was approximately the same as that of the Group 1 cell having the cathode of a sheet pressed to the current collector.

The fifteen Groups 2 and 3 cells were then each pulse discharged using respective 2.2 and 2.25 amp currents for a duration of 10 seconds. The cells were rested at open circuit voltage for 30 minutes after each pulse train of four pulses, the pulses being separated from each other by 15 seconds. The respective current pulses were used to normalize the current loading per gram of SVO material

TABLE 2

| Test Cell | PrePulse OCV (V) | Pulse 1 min. (V) | Pulse 1 Rdc (ohm) | Pulse 2 min. (V) | Pulse 2 Rdc (ohm) | Pulse 3 min. (V) | Pulse 3 Rdc (ohm) | Pulse 4 min. (V) | Pulse 4 Rdc (ohm) |
|---|---|---|---|---|---|---|---|---|---|
| Group 2 resistance welded lead (15 cell avg.) | 3.243 | 0.545 | 1.226 | 0.421 | 1.283 | 0.366 | 1.308 | 0.337 | 1.321 |
| Group 3 ultrasonic welded lead (15 cell avg.) | 3.251 | 1.761 | 0.662 | 1.774 | 0.656 | 1.815 | 0.638 | 1.861 | 0.618 |

As shown in Table 2, the average of the Group 3 cells using the ultrasonically welded tabs displayed approximately half the dc (internal) resistance as that of the average of the Group 2 cells. Internal resistance (Rdc) is most pronounced in Li/SVO after about 40% of the useful energy has been discharged from the cell. Internal resistance is undesirable as it results in reduced energy especially during pulse discharge.

It is intended that the foregoing description and example only be illustrative of the present invention and that the present invention is limited only by the following appended claims.

What is claimed:

1. A method for providing an electrochemical cell, comprising the steps of:
   a) providing a negative electrode
   b) providing a positive electrode of an electrode active material selected from the group:
      i) a first electrode active material having the general formula $SM_xV_2O_y$, wherein SM is a metal selected from Groups IB to VIIB and VIII of the Periodic Table of Elements, and wherein x is about 0.30 to 2.0 and y is about 4.5 to 6.0 in the general formula; and ii) a second electrode active material having the general formula $Cu_xAg_yV_2O_z$, wherein about $0.01 \leq x \leq 1.0$, about $0.01 \leq y \leq 1.0$ and about $5.01 \leq z \leq 6.5$;

c) combining the electrode active material with a binder mixture comprising at least a first binder of a halogenated polymeric material and a polyamic acid precursor of a second binder to form an electrode active slurry;

d) coating the electrode active slurry onto at least one side of a conductive substrate to form an electrode structure;

e) heating the electrode structure at a temperature of at least about 130° C. to convert the polyamic acid to a polyimide second binder insoluble in the electrolyte and to drive off water resulting from the conversion of the polyamic acid to the polyimide; and f) electrically associating the negative and positive electrodes with each other activated by an electrolyte.

2. The method of claim 1 wherein a halogen of the halogenated polymeric material is fluorine.

3. The method of claim 1 including providing the first binder in a powdered form.

4. The method of claim 1 including combining the electrode active material and the binder mixture in a solvent.

5. The method of claim 4 including selecting the solvent from the group consisting of water, methyl ethyl ketone, cyclohexanone, isophoron, N-methylpyrrolidone, N,N-dimethylformamide, N,N-dimethylacetamide, toluene, and mixtures thereof.

6. The method of claim 1 wherein the positive electrode is a cathode in an alkali metal electrochemical cell.

7. The method of claim 1 wherein the positive electrode is silver vanadium oxide in a secondary electrochemical cell.

8. The method of claim 1 wherein the first binder is polyvinylidene fluoride, the second binder is polyimide as a product of the conversion of polyamic acid and the cell is of a lithium/silver vanadium oxide couple.

9. The method of claim 1 wherein the ratio of the first binder to the second binder is, by weight, about 1:99 to about 99:1.

10. The method of claim 1 wherein the ratio of the first binder to the second binder is, by weight, about 40:60 to about 60:40.

11. The method of claim 1 wherein the electrode is intended for incorporation into a lithium ion cell as a positive electrode of silver vanadium oxide.

12. The method of claim 1 including heating the electrode structure at a temperature of about 130° C. to about 360° C. for a period of about 30 minutes to about 5 hours prior to incorporation of it into an electrochemical cell.

13. The method of claim 1 including heating the electrode at a first temperature of about 140° C. for about 30 minutes, followed by heating at a second temperature of about 200° C. for about 30 minutes, followed by heating at a third temperature of about 350° C. for about one hour.

14. The method of claim 1 including selecting the conductive substrate from the group consisting of titanium, aluminum, nickel, stainless steel and copper.

15. The method of claim 1 including providing the conductive substrate as a current collector and connecting the current collector to a terminal lead by ultrasonic welding.

16. The method of claim 15 wherein the terminal lead is either a terminal pin or a casing for the cell.

17. The method of claim 1 including coating the electrode active slurry on the conductive substrate to a thickness of about 0.01 inches to about 0.05 inches.

18. The method of claim 1 including coating the electrode active slurry on the conductive substrate using a metering roller.

19. The method of claim 1 including coating the electrode active slurry on the conductive substrate using a doctor blade.

20. The method of claim 1 including coating the electrode active slurry on the conductive substrate using a knife over roll technique.

21. The method of claim 1 including first coating the electrode active slurry onto one side of the conductive substrate followed by heating to convert the polyamic acid to the polyimide second binder and then coating the electrode active slurry onto the other side of the conductive substrate followed by heating to convert the polyamic acid to the polyimide second binder insoluble in the electrolyte.

* * * * *

UNITED STATES PATENT AND TRADEMARK OFFICE
CERTIFICATE OF CORRECTION

PATENT NO. : 6,797,019 B2
DATED : September 28, 2004
INVENTOR(S) : Esther Takeuchi et al.

It is certified that error appears in the above-identified patent and that said Letters Patent is hereby corrected as shown below:

Column 10,
Line 63, after "electrode" please insert -- ; --; and

Column 12,
Line 7, after "electrode" please insert -- structure --.

Signed and Sealed this

Twenty-first Day of December, 2004

JON W. DUDAS
*Director of the United States Patent and Trademark Office*